Sept. 22, 1953   R. D. RICHARDSON ET AL   2,652,727
DEVICE FOR MEASURING ABSOLUTE PRESSURE
Filed Sept. 24, 1947   2 Sheets-Sheet 1

INVENTORS.
ROBERT D. RICHARDSON &
BY GEORGE B. BAILEY.
Altsch & Knoblock
ATTORNEYS Sept. 22, 1953  R. D. RICHARDSON ET AL  2,652,727
DEVICE FOR MEASURING ABSOLUTE PRESSURE
Filed Sept. 24, 1947  2 Sheets-Sheet 2

INVENTORS.
ROBERT D. RICHARDSON &
BY  GEORGE B. BAILEY.

Altach + Knoblock
ATTORNEYS

Patented Sept. 22, 1953

2,652,727

UNITED STATES PATENT OFFICE 2,652,727
DEVICE FOR MEASURING ABSOLUTE
PRESSURE

Robert D. Richardson, Coolspring Township, La Porte County, and George B. Bailey, Long Beach, Ind., assignors to The Hays Corporation, Michigan City, Ind., a corporation of Indiana Application September 24, 1947, Serial No. 775,938

3 Claims. (Cl. 73—398)

1

This invention relates to improvements in devices for measuring absolute pressure, such as liquid pressure and gas pressure.

Devices of this character are useful for various purposes. Thus it is frequently desirable in carrying on chemical processes to control the processing with respect to the absolute fluid pressure at one point of the process instead of with respect to barometric or atmospheric pressure. The instant device may be used for measurement of such pressures or for effecting the control of a process in response to a predetermined absolute pressure condition. Another use of such a device is as a means for compensating for the effect of variations in pressure upon a device for measuring some other property of a fluid which varies with pressure or upon a device for controlling a process in response to variations in some property of a fluid which is subject to fluctuation incident to variations in pressure. One use of the latter type is as a pressure compensator for a gas analyzer.

Heretofore the standard procedure used in measuring absolute pressure is to provide equipment wherein a substantially complete vacuum is maintained and a spring is correlated in a manner to act as an absolute pressure reference. This prior procedure has not been fully satisfactory nor highly accurate because the springs which are used therein are subject to hysteresis or other errors through their full scale or range of movement. These errors are proportional to the total absolute pressure measurable by the device. Consequently, for any measurement through any restricted range of absolute pressures where the lower pressure limit is not zero, the errors are proportional to the absolute measurable pressure, and being applied to a limited range are magnified in their effect upon measurement in the limited range. Furthermore, the errors inherent in the spring are sensitivity errors and therefore cannot be removed by calibration.

The primary object of this invention is to provide a device of this character which provides a highly accurate and simple device for measuring absolute pressure and one which overcomes the disadvantages of prior devices as mentioned above.

A further object of the invention is to provide a device wherein a constant volume of gas, retained in a sealed container having a resilient pressure wall, is used as a reference pressure with respect to which a fluid pressure to be measured is compared by subjecting the same against said pressure sensitive wall, and movements of said wall control thermal means for expanding the reference gas to counterbalance the fluid pressure being measured and to control a thermally sensitive electric element positioned in the container for said reference gas so that the electrical value of the last named ele-

2 ment is varied in proportion to the pressure being measured.

A further object is to provide a gas analyzer of the type in which variations in the constituents of a gas produce electrical variations to actuate an electrical measuring device, with means responsive to the pressure of the gas for producing electrical variations which can be imposed on the measuring device in a manner to compensate the operation thereof according to variations in gas pressure.

A further object of this invention is to provide a device of this character which is electrical in operation, wherein the power for measurement may be supplied from external sources, such as a 110 volt power line, and wherein the pressure itself is balanced to a null point.

A further object is to provide a device of this character wherein pressure measurements are converted to direct electrical measurements obtained through a minimum of moving parts.

Other objects will be apparent from the following specification.

This device operates upon the principle that when a constant volume of gas confined in a sealed chamber having a diaphragm as one wall thereof is used as an absolute pressure reference, the gas sample pressure to be measured can be applied to the diaphragm against the smaller pressure within the sealed housing to urge the diaphragm to a position to normally hold closed two electrical contacts carried respectively by the housing and by the diaphragm thereof. These contacts can control a circuit to a heating element associated with the chamber containing the reference gas in such a manner that when the gas pressure being measured is great enough to hold the diaphragm in contact closing position, the heating element is energized to heat the reference gas for the purpose of expanding it and generating pressure which will counterbalance the pressure of the gas being measured. In the event the pressure of the gas being measured lowers sufficiently to permit the contacts to separate, the heating element is de-energized to permit the reference gas to cool and its pressure to lower to the extent necessary to again effect a closing of the electrical contacts. In other words, the device operates upon the principle of varying the pressure of the reference gas to counterbalance the gas pressure being measured. A thermally sensitive resistor is mounted within the housing or chamber containing the reference gas and measures the heat generated for the purpose of balancing the diaphragm, thereby becoming a measuring means for the pressure involved. This operation is possible because of the gas law $$\frac{PV}{T} \text{ equals } K$$

where P equals pressure, T equals temperature, V equals volume, and K is a constant. It will be apparent that in this device the volume is also a constant for all practical considerations, and therefore, since $$T \text{ equals } \frac{VP}{K}$$

then T is a function of P only.

Figure 4:
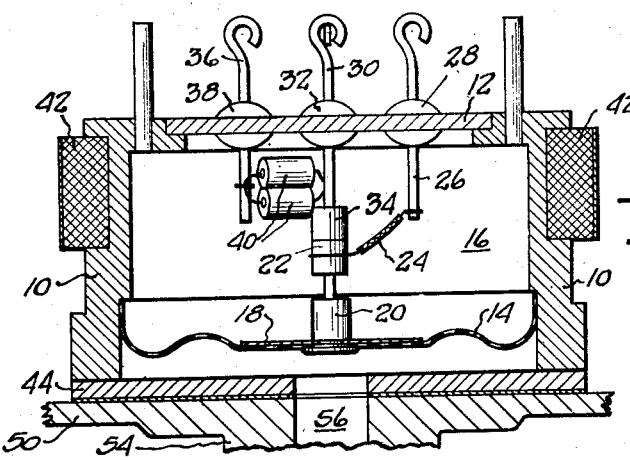
Fig. 4 is a detail sectional view of the pressure sensitive parts of the pressure measuring device.

Referring to the drawing, and particularly to Fig. 4, a gas pressure measuring cell is illustrated as consisting of a cylinder 10 having a closed rigid end wall 12 at one end thereof and sealed at its opposite end by a diaphragm 14. The device is constructed to be hermetically sealed so that the chamber 16 or cavity thereof, when supplied with a reference gas at a pressure lower than the pressure to be measured considered at ambient temperature, will maintain its sealed condition at all times. In the preferred embodiment of the invention for use with a gas analyzer, the reference gas will preferably be under a pressure of approximately 25 inches of mercury under normal conditions, although this pressure is illustrative for certain uses only and it will be understood that the pressure may be varied as required by other conditions and purposes of use.

The diaphragm 14 preferably mounts a rigid center plate 18 to which is secured a rigid stem 20 which mounts a contact 22 positioned within the chamber. This contact is connected by an electric lead 24 with a conductor 26 mounted in a rigid wall of the chamber, such as the wall 12, to project therethrough and being sealed at 28 at the opening at which it passes through said wall. A second rigid conductor 30 positioned in substantially axial alignment with the contact 22 passes through a sealing member 32 and the wall 12 to project into the chamber 16. The member 32 mounts a contact 34 at its inner end with which the contact 22 is engageable for making and breaking an electrical circuit as will be described herein. By virtue of the low pressure existing within the chamber 16, the diaphragm normally urges the contact 22 into engagement with the contact 34. A pair of conductors, including conductor 36 and another conductor (not shown), each pass through a sealing element 38 and the wall 12 to terminate within the chamber 16. Electric resistor element or elements 40 are preferably electrically connected to the last named pair of conductors including conductor 36, being positioned within the sealed chamber 16. The chamber 10 is preferably encircled by and mounts an annular heating coil 42 adapted to be energized for the purpose of heating the chamber 16 and the gas contents thereof. The circuit for controlling this heating element 42 will be explained hereinafter.

Figure 2:
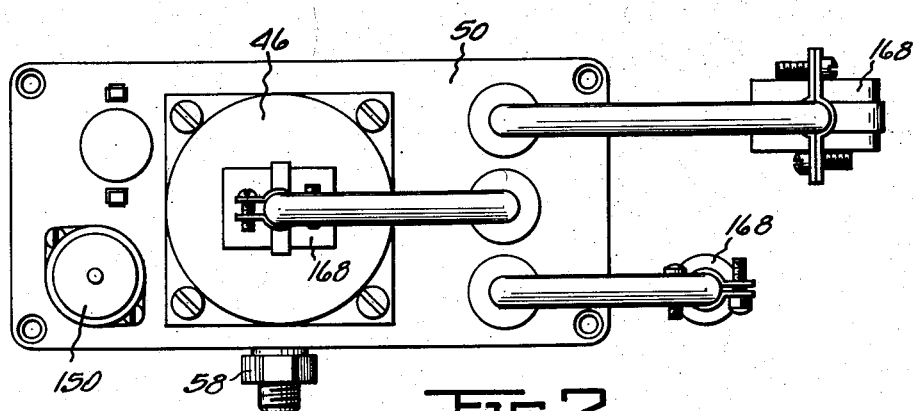
Fig. 2 is a top plan view of one embodiment of a pressure measuring device adapted to be used in conjunction with a fluid pressure system for measuring pressure variations therein.
Figure 3:
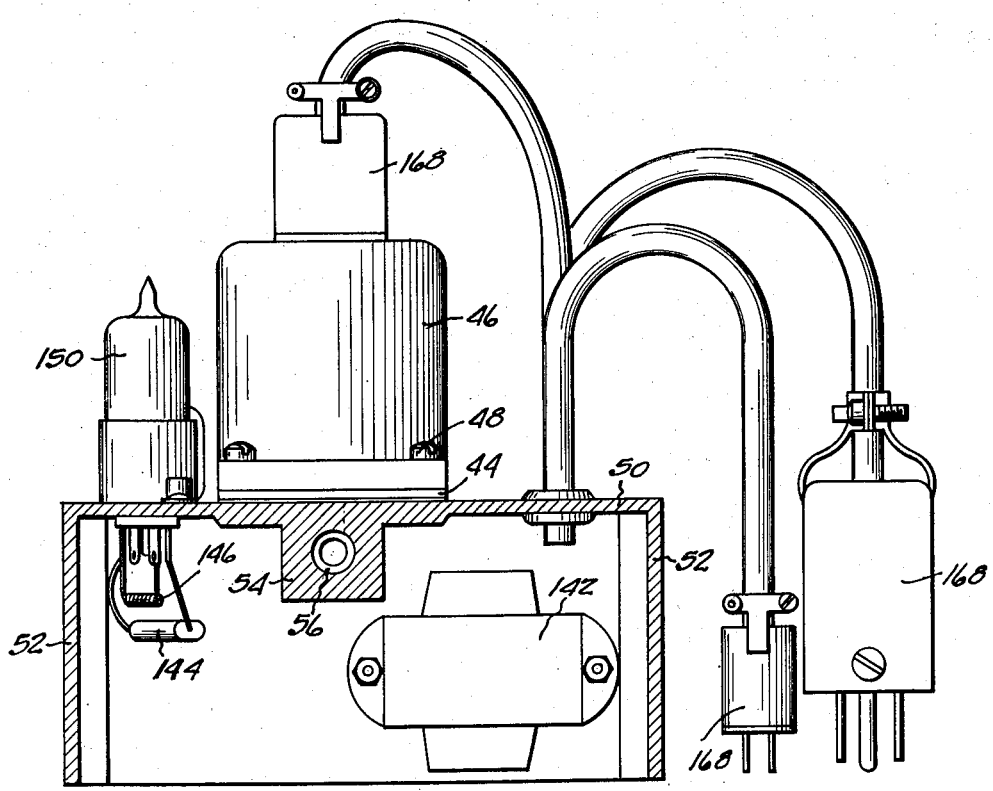
Fig. 3 is a side view of the device with parts shown in section.

The pressure sensitive unit illustrated in Fig. 4 preferably constitutes one part of the unit shown in Figs. 2 and 3 and is mounted upon a base 44 to be enclosed within a cover or shield 46 which is secured to the base 44 removably as by means of machine screws 48 or like securing means. This unit in turn is mounted upon a support of the character illustrated in Fig. 3, and including a horizontal upper wall 50 and side walls 52 which cooperate to define a chamber. The wall 50 has a depending thickened or rib portion 54 positioned below the plate 44 and a bore 56 is formed in said thickened portion 56 and opens at the top wall 50 at its inner end so as to communicate with the lower end of the chamber 10 outwardly of or below the diaphragm 14. The fitting 58 is carried by the base structure 50, 52 to provide a communication for a conduit (not shown) leading to a supply of gas whose pressure is to be measured. Thus it will be apparent that the gas supply from the source being measured has a sealed communication with the measuring device, enabling the application to the diaphragm 14 of the full pressure of the gas being measured for operation of the pressure measuring device. It will be understood that the conduit leading from the fitting 58 may be connected with a gas supply line or branch therefrom, which gas supply line may lead to a gas analyzer of the electrical type, such as a device of the thermal conductivity type or a device of the type shown in the co-pending patent applications of Robert D. Richardson, Ser. No. 595,569, filed May 24, 1945, and Ser. No. 762,903, filed July 23, 1947.

Figure 1:
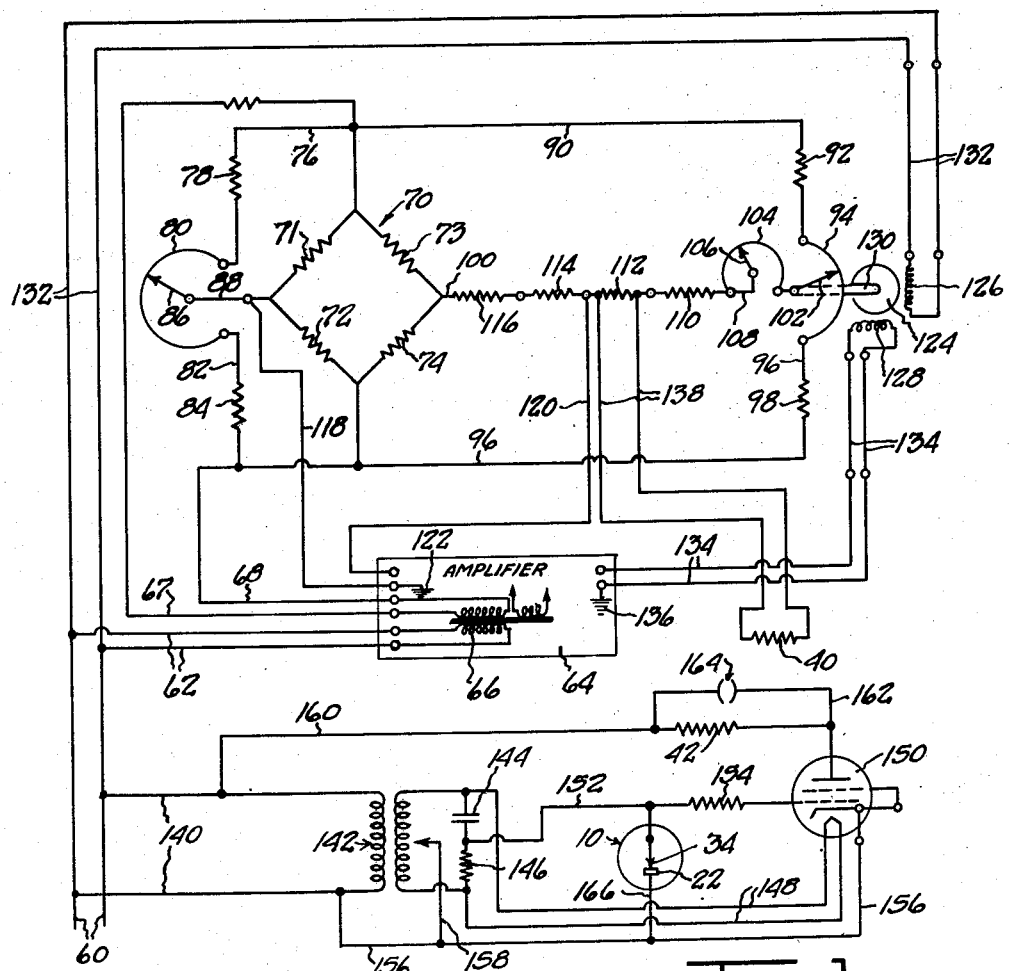
Fig. 1 is a wiring diagram of an electrical measuring device wherein variations in absolute pressure are applied in pressure compensating manner to the measuring device.

Referring now to Fig. 1, a Wheatstone bridge circuit is illustrated which may measure the electrical variations of the electrical gas measuring device and compensate those measurements in accordance with the pressure variations in the gas sample measured by the instant absolute pressure measuring device. In this circuit a line 60, which may be at standard power voltage such as 110 volts, has leads 62 branching therefrom to an amplifier unit 64 which has a transformer 66 associated therewith. Leads 67 and 68 are connected with the low voltage windings of the transformer 66 to provide the current supply for a measuring circuit.

The measuring circuit constitutes a Wheatstone bridge circuit 70 having four legs, in each of which is included one of the resistances 71, 72, 73 and 74. Lead 67 is connected with the bridge between the legs 71 and 73, and lead 68 is connected with the bridge between the legs 72 and 74. One or more of the resistances 71, 72, 73, 74 may constitute a variable resistance associated with a device, such as an electrical gas analyzer, to be responsive to the condition which is measured by that device. A lead 76 branches from the lead 67 and preferably has a fixed resistor 78 interposed therein. One end of the lead 76 is connected with a slide wire 80 of a variable resistor whose opposite end is connected by a lead 82 with the lead 68. The lead 82 preferably has a fixed resistor 84 therein which balances the resistor 78. The slide wire 80 forms a part of a variable resistor having a slide contact 86 which is adapted to be adjusted manually along the length of the slide wire 80 and which is connected by a lead 88 with the measuring bridge 70 between the legs 71 and 72 of that bridge.

A lead 90 branches from the lead 67 and has a fixed resistor 92 interposed therein. The lead 90 is connected with a slide wire 94 whose opposite end is connected with a lead 96 which is in turn connected with the lead 68. The lead 96 has a fixed resistor 98 interposed therein which balances the resistor 92. The lead 100 is connected to the measuring bridge 70 between the legs 73 and 74 thereof and is connected with a slide contact 102 engaging the slide wire 94.

It will be apparent from the foregoing that a bridge circuit is provided which comprises a primary or measuring bridge 70 having legs 71, 72, 73, 74 and a secondary or control bridge. The secondary bridge is made up of each of the legs of the primary bridge, plus a leg in parallel therewith. The secondary leg in parallel with leg 71 of the primary bridge consists of the leads 67, 76, the resistor 78, the slide wire 80, the slide contact 86 and the lead 88. The other legs of the secondary bridge will be apparent from an inspection of the circuit.

As illustrated herein, the lead 100 may have interposed therein a trim calibrating slide wire 104 engaged by slide contactor 106 having a lead 108 connected to one side of the slide wire 104. Also there may be interposed in the lead 100 a plurality of compensating resistors, here illustrated as resistors 110, 112, 114 and 116.

A lead 118 is tapped from lead 88 intermediate the connections of said lead with the measuring bridge 70 and the slide contactor 86. A lead 120 is connected to the lead 100 at any selected position, here illustrated as between the resistances 112 and 114, although the point of connection of the lead 120 may be made at any other point with reference to the resistors 110, 112, 114 and 116 as desired for the purposes of the device. The leads 118 and 120 extend to the input terminals of the amplifier 64, one thereof preferably being grounded at 122.

A reversing motor of the 2-phase type having rotor 124 and coils 126 and 128 has a mechanical connection, as by a shaft 130, with the slide contact 102 for the purpose of adjusting the position of said contact. The field winding 126 is connected by leads 132 to the leads 60. The field winding 128 of the motor is connected by leads 134 to the output terminals of the amplifier 64, one of which is preferably grounded at 136. This device and the various elements thereof, such as the motor, the amplifier and other parts, are preferably constructed as disclosed in the copending application of Robert D. Richardson, Ser. No. 724,047, filed January 24, 1947, and the motor 124 thereof is preferably of the type known as a drag cup motor. The field windings 128 of the motor are responsive to the phase and amplitude of the measuring device, that is, from the Wheatstone bridge 70 as amplified by the amplifier 64. The phase of the field windings 128 as determined by the output of the bridge and the amplifier upon an unbalance actuation of the bridge will either lead or lag the phase in field winding 126 so that the direction of the phase displacement in the winding 128 relative to the winding 126 will depend upon the nature and sense of the variation in the condition to which the device responds. Consequently, the direction of operation of the motor will depend upon the character of the output signal from the amplifier and the motor will be caused to rotate in one direction or the other for rebalancing the electrical network of the device, that is, for rebalancing the Wheatstone bridge 70 by varying the setting of the slide contact 102 of the slide wire 94. It will be apparent that the shaft 130 may be used to actuate an indicator, a recorder or a process controller.

Where our improved pressure measuring device is to be used as a compensator, one of the resistances in the line 100, here shown as the resistance 112, is connected by leads 138 with the terminals 36 of the device shown in Fig. 4 between which the thermally responsive resistor 40 of that device is connected. It will be understood, however, that if variations in absolute pressure as measured by the device shown in Fig. 4 are to be measured directly, the measuring resistor 40 may be connected to one of the resistances 71, 72, 73, 74 of the Wheatstone bridge 70 so that the operation of the motor 124 and of the slide contact 102 will respond to the variations in the absolute pressure being measured by the device shown in Fig. 4.

The electrical connections of our improved gas pressure measuring device with the electrical measuring circuit hereinabove described are also illustrated in Fig. 1. Leads 140 branch from the supply line 60 and lead to the primary of a transformer 142. Phase control means, here illustrated as a condenser 144 and a resistor 146, have a series connection across the output terminals of the secondary of the transformer. Leads 148 extend from the output terminals of the secondary coil of the transformer to the heater of an electron emission tube 150 which is preferably a thyratron tube. A lead 152 is connected at one end between the condenser 144 and the resistor 146 and leads to one of the control grids of the tube 150, preferably having a resistor 154 interposed therein. A lead 156 branches from one of the leads 140 and extends to the cathode of the tube 150 and also to one of the grids of said tube. A lead 158 branches from lead 156 and is tapped at an intermediate point to the secondary coil of the transformer 152, the connection therewith preferably being a slide contact and illustrated as a substantially center tap. A lead 160 branches from one of the leads 140, and is connected to the plate of the tube 150. A heating coil 42 is interposed in the lead 160. A branch circuit 162 in parallel with the heating coil 142 may be provided with a signal light 164, such as a neon bulb. A lead 166 connects the leads 152 and 156, and our pressure measuring device, as illustrated in Fig. 4, is electrically interposed in said lead 166 with the contacts 22 and 34 thereof, serving to make and break the circuit through the lead 166.

In the operation of the device as a compensator for a gas analyzer as illustrated herein, it will be apparent that the primary measuring impulses from the gas analyzer will be supplied to one of the legs 71, 72, 73, 74 of the Wheatstone bridge 70 so that the Wheatstone bridge circuit will respond to the variations in the gas content measured by said analyzer. A branch conduit leading from the supply line to said analyzer to the fitting 58 of our device will render our device responsive to the pressure of the gas being measured by the analyzer. This gas pressure acting upon the diaphragm 14 against the lower pressure contained within the chamber 16 thereof will serve to normally hold the contacts 22, 34 closed to close the circuit to the heating element 42. As long as these contacts remain closed the heat element 42 operates and serves to heat the gas contained within the chamber 16 to expand the same. The expansion of the gas increases the gas pressure in the chamber 16 and, when that pressure is increased to a value above the pressure of the gas being measured, the diaphragm 14 will be flexed outwardly in a direction to disengage the contacts 22 and 34. This breaks the circuit to the heating coil 42 so that the reference gas within the chamber 16 is permitted to cool, thereby reducing its pressure until the balance of pressure acting upon opposite sides of the diaphragm 14 is such that the diaphragm 14 again presses the contact 22 into engagement with the contact 34, whereupon the heating operation is repeated. By virtue of the fact that the reference gas in the chamber 16 is at a low pressure at atmospheric temperature, the normal position of the contacts is in engagement so that the heating element is normally energized and the chamber 16 is normally heated. The resistors 40 being sensitive to temperature are therefore heated at all times so that the effect thereof may be imposed upon the measuring circuit through the resistor 112 in that circuit which is connected with the heating coil 40. The elements 40 and 112 compensate the output of the Wheatstone bridge 70 so that the final reading of the electrical measuring device as determined by the operation of the motor 124 is a reading of the condition being measured by the primary measuring device, such as a gas analyzer, properly compensated for variations in the pressure of the gas being measured, to which pressure the element 40 responds.

While the circuit of our device has been illustrated herein as an electronically controlled device using the thyratron tube 150 and the phase controlling means 144 and 146 required to fire the thyratron tube 150, it will be understood that such electronic control means and tube firing means are not essential and that the device may be connected in series with the heating coil 42 by leads extending or connected directly to the line voltage 60. The electronic device is preferred, however, since it prevents arcing between the contacts 22 and 34 when the circuit is made and broken at such contacts. It will be understood that upon breaking of the contacts 22 and 34, the grid of the tube is kept sufficiently negative to stop the tube from firing. This is accomplished by the phase controlling means 144, 146 which applies an alternating current of the proper phase and magnitude relative to the firing voltage of the grid to prevent the tube from firing. The energy in the circuit leading to the grid of the tube and in which the contacts 22 and 34 are interposed, which is required to operate the grid of the tube 150, is of such low value that arcing does not occur between the contacts. When the contacts 22 and 34 are closed, the grid and cathode voltages of the tube are rendered equal by virtue of the connection of the lead 166 across the leads 152 and 156 extending to the said grid and cathode so that the tube is permitted to fire.

Referring to Figs. 2 and 3, it will be seen that the various electrical leads of our pressure measuring device as a unit are provided with detachable plug connectors 168 which accommodate the removable connection of the various leads of the device with the power circuit and the circuits of the electrical measuring device. Furthermore, it will be observed that the device is compact and that all of the elements, including the gas pressure measuring device, the tube 150, its phase controlling firing means 144 and 146 and the transformer 142, are all mounted upon the frame or housing 50, 52 of the device.

While only one embodiment of the invention has been illustrated and described herein, which constitutes the preferred embodiment of the invention, it will be understood that changes may be made in the device within the scope of the appended claims without departing from the spirit of the invention.

We claim:

1. A device for measuring absolute pressure comprising a sealed container for a reference fluid defined in part by a diaphragm, a contact carried by said diaphragm, a fixed contact carried by said container and engageable by said first contact, means for applying a pressure to be measured to said diaphragm, means for heating said reference fluid, a thermally sensitive resistor in said container, and a control circuit for said heating means correlated with said contacts, said circuit including a thyratron electron emission tube including a grid and a cathode, a phase controlling network connected to said grid, a power supply for said cathode, a lead connecting said power supply and said network and having said contacts interposed therein, and measuring means responsive to said resistor.

2. A device for measuring absolute pressure comprising a sealed container for a reference fluid defined in part by a diaphragm, a contact carried by said diaphragm, a fixed contact carried by said container and engageable by said first contact, means for applying a pressure to be measured to said diaphragm, means for heating said reference fluid, a thermally sensitive resistor in said container, and a control circuit for said heating means correlated with said contacts, said circuit including a transformer, a thyratron electron emission tube including a grid, a plate and a cathode, a phase controlling network connecting said transformer and said grid and normally applying to said grid a voltage to prevent firing of the tube, a power supply to said grid, a lead shunting said network and having said contacts interposed therein, said heating means being connected to the plate of said tube, and measuring means responsive to said resistor.

3. A device for measuring absolute pressure comprising a sealed container for a reference fluid defined in part by a diaphragm, a contact carried by said diaphragm, a fixed contact carried by said container and engageable by said first contact, means for applying a pressure to be measured to said diaphragm, means for heating said reference fluid, a thermally sensitive resistor in said container, and a control circuit for said heating means correlated with said contacts, said circuit including a transformer, a thyratron electron emission tube including a grid, a plate and a cathode, a phase controlling network connecting said transformer and said grid and normally applying to said grid a voltage to prevent firing of the tube, a power supply to said grid, and a lead shunting said network and having said contacts interposed therein, said heating means being connected to the plate of said tube, a signal connected in said circuit in parallel with said heating means, and measuring means responsive to said resistor.

ROBERT D. RICHARDSON.
GEORGE B. BAILEY.

References Cited in the file of this patent

UNITED STATES PATENTS

| Number | Name | Date |
|---|---|---|
| 1,552,321 | Lea | Sept. 1, 1925 |
| 2,231,570 | Ryder | Feb. 11, 1941 |
| 2,251,751 | Minter | Aug. 5, 1941 |
| 2,256,395 | Laub | Sept. 16, 1941 |
| 2,307,626 | Kelly | Jan. 5, 1943 |
| 2,388,542 | Hobbs | Nov. 6, 1945 |
| 2,459,268 | Elkins | Jan. 18, 1949 |
| 2,465,682 | Goldstein | Mar. 29, 1949 |
| 2,472,645 | Clark | June 7, 1949 |